United States Patent
Saito et al.

(10) Patent No.: US 9,540,186 B2
(45) Date of Patent: Jan. 10, 2017

(54) CONVEYOR SYSTEM AND CONVEYANCE METHOD

(71) Applicant: FANUC CORPORATION, Minamitsuru-gun, Yamanashi (JP)

(72) Inventors: Shunichi Saito, Yamanashi (JP); Yoshitake Furuya, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/001,626

(22) Filed: Jan. 20, 2016

(65) Prior Publication Data
US 2016/0214262 A1    Jul. 28, 2016

(30) Foreign Application Priority Data

Jan. 23, 2015  (JP) ................................. 2015-011107

(51) Int. Cl.
  *B65G 47/90*    (2006.01)
  *B25J 15/00*    (2006.01)
  *B25J 15/02*    (2006.01)
(52) U.S. Cl.
  CPC ............ *B65G 47/90* (2013.01); *B25J 15/0061* (2013.01); *B25J 15/02* (2013.01); *B65G 47/904* (2013.01)
(58) Field of Classification Search
  CPC . B25J 15/0052; B25J 15/0061; B25J 15/0028; B25J 15/0033; B25J 15/02; B65G 47/90; B65G 47/904; B66C 1/30; B66C 1/62
  USPC ......... 294/2, 86.4, 67.22, 81.2, 81.56, 68.27
  See application file for complete search history.

(56) References Cited

U.S. PATENT DOCUMENTS

| | | | | |
|---|---|---|---|---|
| 3,249,064 A | * | 5/1966 | Barry | ........................ B66C 1/66 104/89 |
| 4,273,506 A | * | 6/1981 | Thomson | .................. B25J 9/046 294/106 |
| 4,968,082 A | * | 11/1990 | Thinlot | ................... B25J 15/026 294/119.1 |
| 5,752,729 A | * | 5/1998 | Crozier | ................. B66C 1/0218 294/188 |
| 7,455,338 B2 | * | 11/2008 | Jenney | ....................... B66C 1/10 294/67.5 |
| 7,997,634 B2 | * | 8/2011 | Piispanen | ................. B66C 1/36 294/81.56 |

(Continued)

FOREIGN PATENT DOCUMENTS

| | | |
|---|---|---|
| CN | 104647391 A | 5/2015 |
| JP | 62166981 | 7/1987 |

(Continued)

*Primary Examiner* — Dean Kramer
(74) *Attorney, Agent, or Firm* — RatnerPrestia (57) ABSTRACT

The conveyor system of the present invention comprises a conveyor robot having a hand and arm, and a pair of gripping jigs attached to a conveyed object. The hand of the conveyor robot comprises a body part attached to an arm, a pair of projecting parts projecting out from different positions of the body part in the same direction, hook parts provided on the pair of projecting parts, and pushing parts attached to the body part adjoining the pair of projecting parts and configured to move along the projection direction of the pair of projecting parts to generate a pushing force. Each gripping jig attached to a conveyed object comprises of a pushed part pushed by a pushing part of the hand, and a rod-shaped part caught on a hook part of the hand.

6 Claims, 5 Drawing Sheets

(56) References Cited

U.S. PATENT DOCUMENTS

| 8,414,042 B2* | 4/2013 | Landes | B65B 35/16 |
| | | | 294/106 |
| 2005/0008469 A1* | 1/2005 | Jung | B25J 15/0052 |
| | | | 414/729 |
| 2012/0056440 A1* | 3/2012 | Yeum | B25J 15/0052 |
| | | | 294/81.2 |

FOREIGN PATENT DOCUMENTS

| JP | 04364754 | 12/1992 |
| JP | 05031689 | 2/1993 |
| JP | H 09-150384 A | 6/1997 |
| JP | 2003159688 | 6/2003 |
| JP | 2010188474 | 9/2010 |

* cited by examiner

CONVEYOR SYSTEM AND CONVEYANCE METHOD

BACKGROUND OF THE INVENTION

1. Field of the Invention

The present invention relates to a conveyor system and conveyance method for conveying a plurality of types of objects having various shapes.

2. Description of the Related Art

A robot hand capable of gripping various shapes of objects has been known in the past. For example, JP H09-150384A proposes a robot hand comprising a plurality of finger mechanisms each of which can exert a drive force in at least one degree of freedom, and a base part supporting the base end parts of these finger mechanisms. In particular, the finger mechanisms of the robot hand of JP H09-150384A comprise pluralities of links connected through rotary joints. These links are rotated by the rotary joints so as to change the posture of the finger tips.

However, the above finger mechanisms have complicated structures including pluralities of links, and therefore if the robot hand of JP H09-150384A is used to grip a heavy object, the load of the object may damage the finger mechanisms. For this reason, to grip a heavy object, it is necessary to make the robot hand larger as a whole so as to improve the rigidity of the finger mechanisms. If such a large size robot hand is used, it is necessary to also make the robot arm to which it is attached larger, and therefore a rise in the capital cost of the system as a whole is unavoidable. Further, to grip a plurality of types of objects with different dimensions, it is necessary to change the robot hand corresponding to the dimensions of the individual objects, and therefore a further rise in the capital cost is caused. Furthermore, when the robot hand of JP H09-150384A is used, the gripping force of the finger mechanisms directly act on the object, and therefore the gripping force may damage the object.

A conveyor system and conveyance method for gripping various shapes of objects with a single hand having a simple structure, have been sought.

SUMMARY OF INVENTION

According to a first aspect of the present invention, there is provided a conveyor system comprising a conveyor robot having a hand and arm, and a pair of gripping jigs attached to a conveyed object, wherein the hand comprising a body part attached to the arm, a pair of projecting parts projecting out from different positions of the body part in the same direction, hook parts attached to the pair of projecting parts, and pushing parts attached to the body part adjoining the pair of projecting parts and configured to move along the projecting directions of the pair of projecting parts to generate pushing forces, and each of the pair of gripping jigs comprises a rod-shaped part caught on a hook part of the hand, and a pushed part pushed by a pushing part of the hand.

According to a second aspect of the present invention, there is provided the conveyor system according to the first aspect, wherein the pair of projecting parts are attached to the body part so as to be able to move relatively along the directions of arrangement of the pair of projecting parts.

According to a third aspect of the present invention, there is provided the conveyor system according to the first or second aspect, wherein the pushing parts are driven by air cylinders.

According to a fourth aspect of the present invention, there is provided the conveyor system according to any one of the first to third aspects, wherein the hand further comprises gripping parts for gripping the rod-shaped parts in conjunction with the hook parts when the rod-shaped parts are caught on the hook parts.

According to a fifth aspect of the present invention, there is provided a conveyance method for conveying an object, using the conveyor system according to any one of the first to fourth aspects, comprising attaching the pair of gripping jigs to the conveyed object so that the rod-shaped parts of the pair of gripping jigs extend in directions opposite to each other, moving the hand with respect to the pair of gripping jigs attached to the conveyed object so that the rod-shaped parts of the pair of gripping jigs are caught on the hook parts of the hand, and moving the pushing parts of the hand move in a direction away from the body part so as to generate a pushing force acting on the pushed parts of the pair of gripping jigs from the pushing parts.

According to a sixth aspect of the present invention, there is provided a conveyance method according to the fifth aspect further comprising attaching the pair of gripping jigs to the conveyed object so that the axes of the rod shaped parts of the pair of gripping jigs match with each other.

These and other objects, features, and advantages of the present invention will become clearer with reference to the detailed description of an illustrative embodiment of the present invention shown in the attached drawings.

DETAILED DESCRIPTION OF EMBODIMENT

Below, an embodiment of the present invention will be explained in detail with reference to the drawings. In the drawings, similar component elements are assigned similar reference notations. Note that the following explanation does not limit the technical scope of the inventions described in the claims or the meaning of terms etc.

Figure 1:
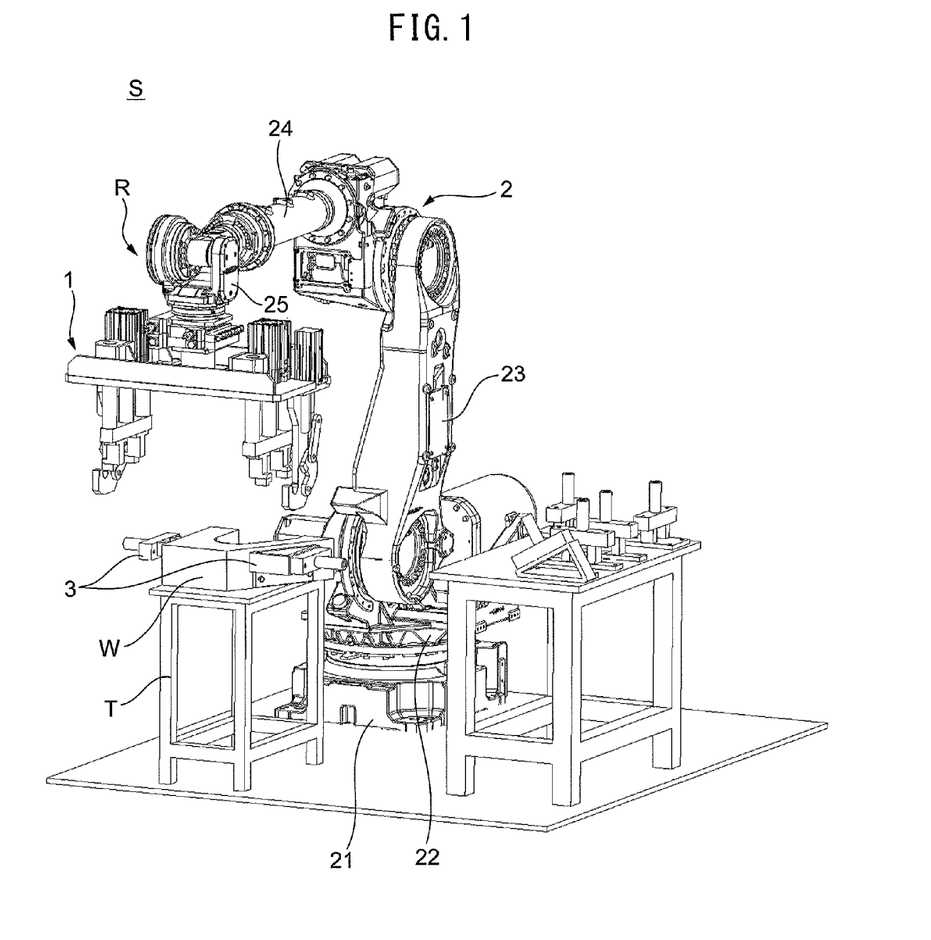
FIG. 1 is a perspective view of a conveyor system of one embodiment of the present invention.

Referring to FIG. 1 to FIG. 6, a conveyor system of one embodiment of the present invention will be explained. FIG. 1 is a schematic view of an illustrative conveyor system S of the present embodiment. As shown in FIG. 1, the conveyor system S of the present example comprises a conveyor robot R such as a vertical multi-articulated robot, and a pair of jigs 3, 3 attached to a conveyed object W. The conveyor system S of the present example is an automation system conveying a conveyed object W placed on a table T to a predetermined destination. As shown in FIG. 1, the conveyor robot R of the present example comprises a hand 1 able to grip the conveyed object W placed on the table T, and an arm 2 having a wrist part 25 to which the hand 1 is attached. The table T is set on the floor surface adjoining the conveyor robot R.

First, the structure of the arm 2 in the conveyor system S of the present embodiment will be explained. As shown in FIG. 1, the arm 2 of the present example is a robot arm comprising a fixed base part 21 fixed to the floor surface, a swivel type movable base part 22 connected to the fixed base part 21, a swivel type bottom arm part 23 connected to the movable base part 22, a swivel type upper arm part 24 connected to the bottom arm part 23, and a swivel type wrist part 25 connected to the upper arm part 24. The arm 2 of the present example can freely change position and posture of the hand 1 attached to the wrist part 25 by the drive forces of servo motors or other drive devices. FIG. 1 illustrates a six-axis robot arm, but the number of axes of the arm 2 in the conveyor system S of the present embodiment is not limited to this. The number of axes of the arm 2 is not limited to this. The structure of the hand 1 of the conveyor system S of the present embodiment will be explained later.

Figure 2:
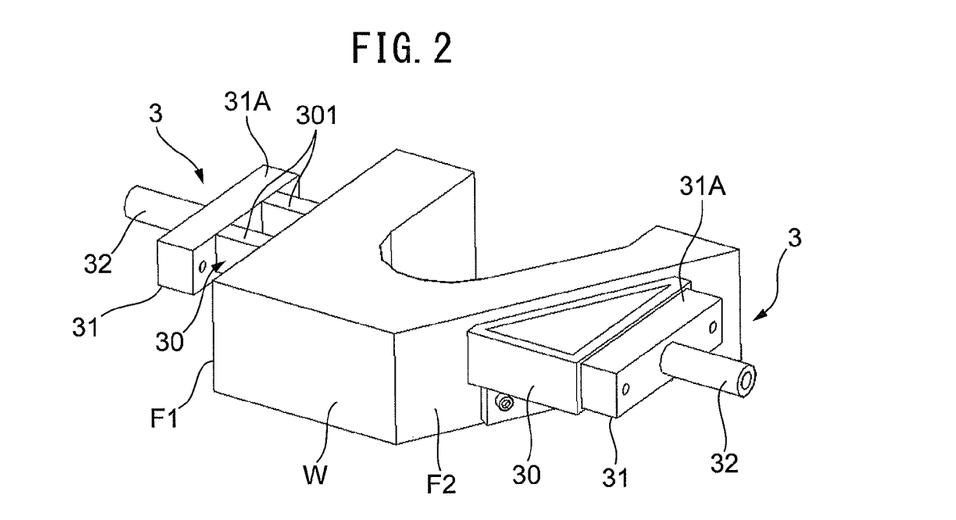
FIG. 2 is a perspective view enlarging the conveyed object and gripping jigs shown in FIG. 1.

Next, the pair of gripping jigs 3, 3 in the conveyor system S of the present embodiment will be explained. FIG. 2 is a perspective view enlarging the conveyed object W and gripping jigs 3, 3 shown in FIG. 1. As shown in FIG. 2, the conveyed object W of the present example has the overall shape of a polyhedron. At one side, a curved cutaway part is provided. Further, the pair of gripping jigs 3, 3 of the present example are attached to a pair of side faces F1, F2 of the conveyed object W which do not cross each other. As shown in FIG. 2, each of the pair of gripping jigs 3, 3 comprises a mounting part 30 attached to the conveyed object W, a block-shaped pushed part 31 fixed to the mounting part 30, and a rod-shaped part 32 projecting out from a side face of the pushed part 31. The above components of the gripping jigs 3 will be explained in detail below.

First, the mounting parts 30 of the gripping jigs 3 have abutting faces able to contact planarly side faces of the conveyed object W and are designed so as to be attached to the side faces of the conveyed object W by connecting members such as bolts. Further, the pushed parts 31 of the gripping jigs 3 have flat shaped pushed faces 31A pushed by the later explained pushing parts 14 of the hand 1 and fastened to predetermined locations of the mounting parts 30. Further, the rod-shaped parts 32 of the gripping jigs 3 have round rod or angular rod shapes projecting out from predetermined locations of the pushed parts 31. More specifically, the rod-shaped parts 32 of the gripping jigs 3 project out from side faces at the opposite sides from the side faces of the pushed parts 31 facing the mounting parts 30. As shown in FIG. 2, the pair of pushed parts 31, 31 have common shapes. Further, the pair of the rod-shaped parts 32, 32 also have common shapes. In this regard, the pair of mounting parts 30, 30 have different shapes corresponding to the shapes of the side faces of the conveyed object W so as to enable the pair of pushed parts 31, 31 and the rod-shaped parts 32, 32 so as to be suitably arranged with respect to the conveyed object W.

More specifically, the mounting part 30 of the gripping jig 3 shown at the left side in FIG. 2 comprises a plate-shaped base part attached to the conveyed object W, and two columnar parts 301 projecting out from the main surface of the base part in the same direction. As shown in FIG. 2, the two columnar parts 301 have the common dimensions. Their front end parts are connected to a side face of the pushed part 31. On the other hand, the mounting part 30 of the gripping jig 3 arranged at the right side in FIG. 2 comprises a single frame-shaped member having a triangular horizontal cross-section. If a pair of gripping jigs 3, 3 having the above structures are attached to the conveyed object W, the hand 1 of the conveyor robot R can grip the conveyed object W through the pair of gripping jigs 3, 3 (see FIG. 1). In this way, even while the conveyed object W is gripped by the hand 1, a direct gripping force is never applied from the hand 1 to the conveyed object W.

Figure 3:
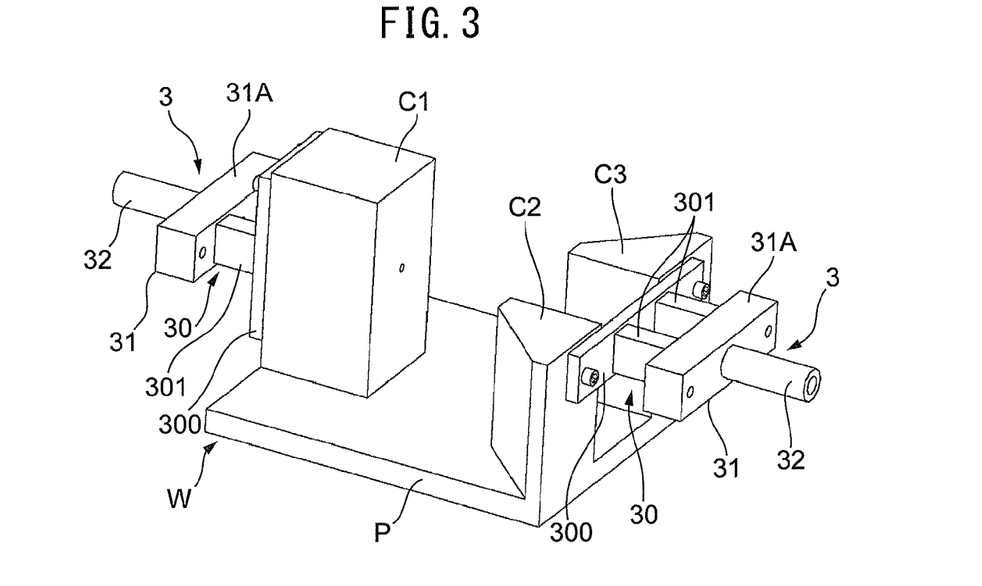
FIG. 3 shows another conveyed object conveyed by the conveyor system of FIG. 1 and gripping jigs corresponding to the conveyed object.

FIG. 3 is a perspective view similar to FIG. 2 and shows another conveyed object W conveyed by the conveyor system S of FIG. 1 and the corresponding gripping jigs 3, 3. As shown in FIG. 3, the conveyed object W of the present example comprises a plate-shaped bottom part B and three columnar parts C1 to C3 projecting out from the main surface of the bottom part P in the same direction. In the example of FIG. 3, each of the pair of gripping jigs 3, 3 has a structure similar to the gripping jig 3 at the left side in FIG. 2. That is, each of the pair of gripping jigs 3, 3 of the present example comprises a mounting part 30 attached to the conveyed object W, a block-shaped pushed part 31 fixed to the mounting part 30, and a rod-shaped part 32 projecting out from a side face of the pushed part 31. Further, each of the pair of mounting parts 30, 30 of the present example comprises a plate-shaped part 300 attached to the conveyed object W, and two columnar parts 301 projecting out from the main surface of the plate-shaped part 300 in the same direction. Note that, the mounting part 30 of the gripping jig 3 at the left side in FIG. 3 is attached to the side face of the first columnar part C1 of the conveyed object W, while the mounting part 30 of the gripping jig 3 at the right side in FIG. 3 is attached straddling the side faces of the second and third columnar parts C2, C3 of the conveyed object W.

As will be understood from FIG. 2 and FIG. 3, the conveyor system S of the present example comprises a plurality of types of gripping jigs 3 with different structures of mounting parts 30, and is designed to use a pair of gripping jigs 3, 3 selected in accordance with the shape of the conveyed object W to grip a conveyed object W. For this reason, the conveyor system S of the present example can convey various types of objects having various shapes. In the conveyor system S of the present example, the pair of gripping jigs 3, 3 are attached to the conveyed object W so that these rod-shaped parts 32, 32 extend in opposite directions from each other. In particular, the pair of gripping jigs 3, 3 are preferably attached to the conveyed object W so that the axes of these rod-shaped parts 32, 32 match with each other. Normally, the pair of gripping jigs 3, 3 are attached to the conveyed object W by manual work of the user. However, the pair of gripping jigs 3, 3 may be attached by an automated process of an attachment device such as a vertical multi-articulated robot.

Figure 4:
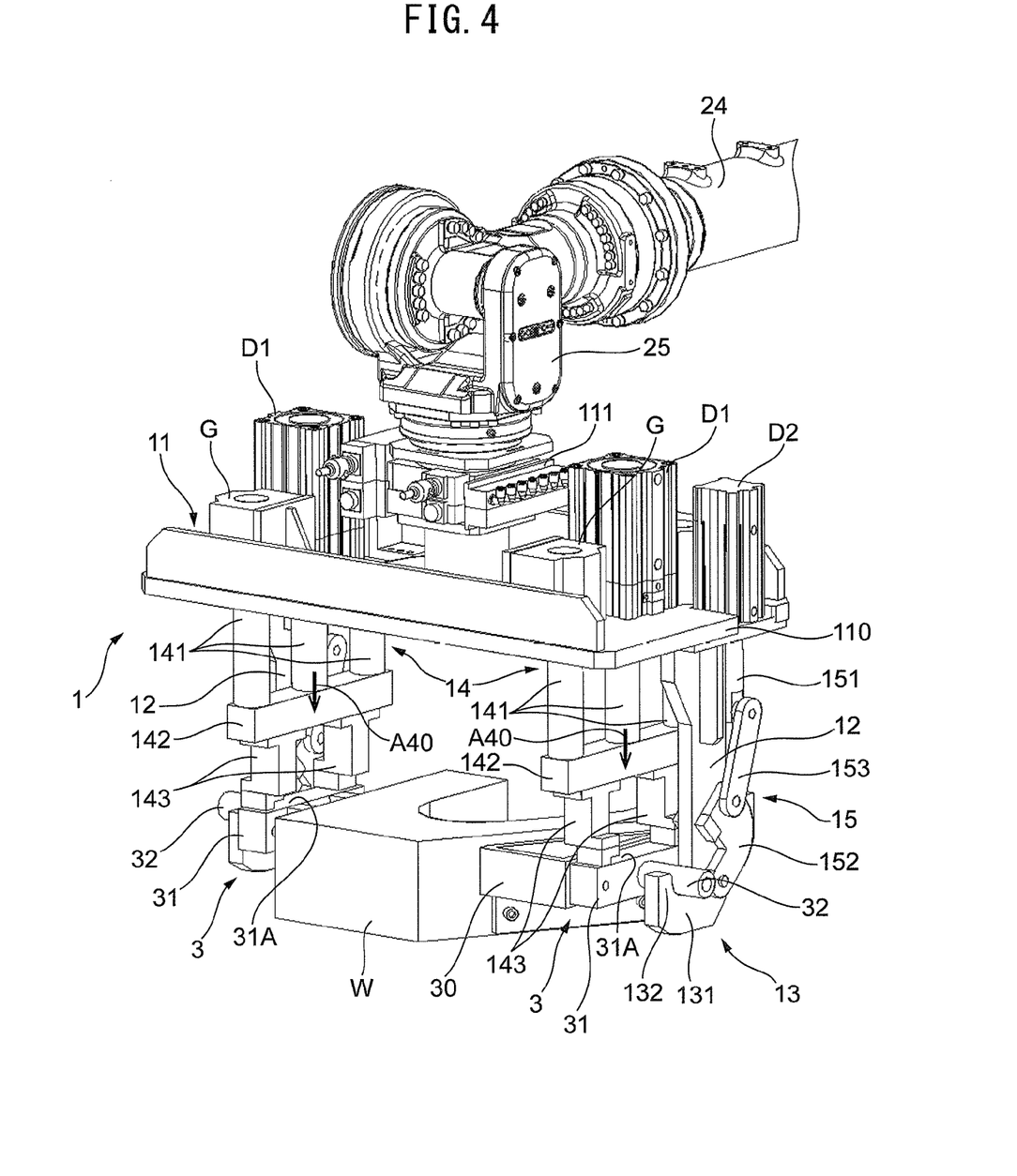
FIG. 4 is a perspective view enlarging the hand shown in FIG. 1.

Next, the structure of the hand 1 in the conveyor system S of the present embodiment will be explained. FIG. 4 is a perspective view enlarging the hand 1 shown in FIG. 1. Note that, the hand 1 in FIG. 1 has still not gripped the conveyed object W, but the hand 1 in FIG. 4 already grips the conveyed object W through the pair of gripping jigs 3, 3. As shown in FIG. 4, the hand 1 of the present example comprises a body part 11 attached to a wrist part 25 of the arm 2, and a pair of projecting parts 12, 12 projecting out from different positions of the body part 11 in the same direction. Furthermore, the hand 1 of the present example comprises a pair of hook part 13, 13 respectively provided at the pair of projecting parts 12, 12, and a pair of pushing parts 14, 14 attached to the body part 11 adjoining the pair of projecting parts 12, 12 and configured to move along the directions of projection of the pair of projecting parts 12, 12 away from the body part 11 to generate pushing forces. The components of the hand 1 will be explained in detail below.

As shown in FIG. 4, the body part 11 of the present example has a plate-shaped base part 110 having a top surface and bottom surface, and an attachment part 111 attached to the top surface of the base part 110 so as so as to be attached to the wrist part 25 of the arm 2. At the top surface of the base part 110 of the body part 11, in addition to the attachment part 111, a pair of the drive devices D1, D1 driving the pair of pushing parts 14, 14 are attached. Furthermore, at the top surface of the base part 110 of the body part 11, a pair of the drive devices D2, D2 driving the later explained pair of gripping parts 15, 15 are attached.

Next, the pair of projecting parts 12, 12 project out from different locations at the bottom surface of the base part 110 of the body part 11 in the same direction. As shown in FIG. 4, the pair of projecting parts 12, 12 have structures symmetrical with respect to a plane vertical to the longitudinal direction of the base part 110. The directions of projection of these are generally vertical to the bottom surface of the base part 110 of the body part 11. The pair of projecting parts 12, 12 are preferably attached to the base part 110 to enable them to move relatively along the longitudinal direction of the base part 110. For example, either of the pair of projecting parts 12, 12 can be attached to the bottom surface of the base part 110 so as to be able to move along the longitudinal direction of the base part 110. In this case, the movement type projecting parts 12 can, for example, be driven by drive devices (not shown) such as servo motors installed at the body part 11. By making the pair of projecting parts 12, 12 move relatively along the longitudinal direction of the base part 110, the distance between the pair of hook parts 13, 13 can be adjusted.

Alternatively, at least one of the pair of projecting parts 12, 12 may be formed so as to be able to be attached to a plurality of mounting locations provided at the bottom surface of the base part 110. These plurality of mounting locations are arranged along the longitudinal direction of the base part 110. In this case as well, by changing the mounting locations of the detachable type projecting parts 12, the distance between the pair of hook parts 13, 13 can be adjusted. In the example of FIG. 4, the pair of projecting parts 12, 12 are arranged at the two end parts in the longitudinal direction of the base part 110.

Next, the pair of hook parts 13, 13 and the pushing parts 14, 14 will be explained. In the example of FIG. 4, the pair of hook parts 13, 13 and pushing parts 14, 14, like the pair of projecting parts 12, 12, have structures symmetrical with respect to a plane vertical to the longitudinal direction of the base part 110. For this reason, below, only the hook part 13 and pushing part 14 of one side will be explained. First, the hook part 13 of the present example is provided at the front end part of the projecting part 12 and has a hook-shaped form for catching the rod-shaped part 32 of a gripping jig 3. More specifically, the hook part 13 of the present example is provided with an intersecting part 131 extending from the front end part of a projecting part 12 to intersect the direction of projection of the projecting part 12 and a turned back part 132 extending from the front end part of the intersecting part 131 in the opposite direction to the direction of projection of the projecting part 12. As shown in FIG. 4, the intersecting part 131 and turned back part 132 of the hook part 13 form a cutaway part able to hold the rod-shaped part 32 of the gripping jig 3 in conjunction with the front end part of the projecting part 12.

Next, each pushing part 14 of the present example comprises a plurality of rod-shaped moving parts 141 projecting out from the bottom surface of the base part 110 of the body part 11 parallel to a projecting part 12, and a connecting part 142 connecting the ends of the plurality of moving parts 141 at the side far from the base part 110. Here, the plurality of moving parts 141 can move in a direction away from the body part 11 along the direction of projection of the projecting part 12 due to the drive force of a drive device D1 provided at the hand 1. The direction of movement of the plurality of moving parts 141 is indicated by the arrow A40 in FIG. 4. Further, the connecting part 142 of the present example has a columnar shape arranged vertical to the plurality of moving parts 141, and can move in the direction of the arrow A40 in FIG. 4 together with the plurality of moving parts 141. Note that, in the hand 1 of the present example, as the drive device D1 of the plurality of moving parts 141, an air cylinder attached to the top surface of the base part 110 is employed. That is, the plurality of moving parts 141 include a piston rod of the air cylinder. Further, the remaining moving parts 141 are guided by a guide part G attached to the top surface of the base part 110.

If continuing to refer to FIG. 4, each pushing part 14 of the present example is further provided with two projection type abutting parts 143 projecting out from the connecting part 142 in the same direction as the projecting part 12. The two abutting parts 143 have common structures. The base end parts of these abutting parts 143 are arranged at different locations in the longitudinal direction of the connecting part 142. In particular, the base end parts of the two abutting parts 143 are preferably arranged at locations equally separated from the center part in the longitudinal direction of the connecting part 142. Further, the front end parts of the two abutting parts 143 are provided with flat pushing surfaces facing forward in these directions of projection.

Further, the two abutting parts 143 can move together with the moving parts 141 and connecting part 142 in the direction of the arrow mark A40 in FIG. 4, and can abut at the two pushing faces against an object positioned at the front of these faces in the movement direction. Note that, the abutting parts 143 of the present example are attached detachably to the connecting part 142, and therefore can be exchanged with other abutting parts 143 different in shape in accordance with need. In particular, the abutting parts 143 of the present example can be exchanged with other abutting parts 143 different in positional relationship of the base end part and front end part in the direction vertical to the projection direction. As a result, along with adjustment of the direction between the pair of hook parts 13, 13 as explained above, it is possible to adjust the distance between the pushing faces of the pair of pushing parts 14, 14.

In particular, as shown in FIG. 4, when the rod-shaped part 32 of a gripping jig 3 is caught by a hook part 13 of the hand 1, the two abutting parts 143 move toward the pushed part 31 of the gripping jig 3 and abut against the pushed surface 31A due to the drive force of the drive device D1. That is, the pushing part 14 of the present example can move from the backward position where the two abutting parts 143 are arranged separated from the pushed surface 31A in the direction vertical to the pushed surface 31A, to the forward position where the two abutting parts 143 abut against the pushed surface 31A.

After that, if the drive force of the drive device D1 continues so as to be applied, the pushing forces along the direction of movement of the two abutting parts 143 act from these abutting parts 143 on the pushed part 31 of the gripping jig 3. As a result, the rod-shaped part 32 of the gripping jig 3 is pushed against the inside surface of the hook part 13, and therefore the gripping jig 3 can be gripped by the hand 1. In particular, the hand 1 of the present example uses two pushing parts 143 to push a gripping jig 3, and therefore the gripping jig 3 can be stably gripped. Note that, the two abutting parts 143 are preferably positioned so as to abut against locations equally separated from the center part in the longitudinal direction of the pushed part 31. Due to this, the gripping jig 3 can be prevented from rotating about the rod-shaped part 32.

Note that, the pair of pushing parts 14, 14, like the pair of projecting parts 12, 12, are preferably attached to the base part 110 so as to be able to move relatively along the longitudinal direction of the base part 110. In this case, at least one of the pair of pushing parts 14, 14 can be driven by a drive device (not shown) such as for example a servo motor mounted on the body part 11. By moving the pair of pushing parts 14, 14 relatively along the longitudinal direction of the base part 110, it is possible to adjust the distance between the abutting surfaces of the pair of abutting parts 143, 143.

Referring to FIG. 4 after this, the hand 1 of the present example further comprises a pair of gripping parts 15, 15 provided at the pair of projecting parts 12, 12. However, the pair of gripping parts 15, 15 are not essential components of the hand 1, and therefore are sometimes omitted. The pair of gripping parts 15, 15 of the present example have symmetrical structures in the same way as the pair of projecting parts 12, 12, and therefore only the gripping part 15 of one side will be explained below. The gripping parts 15 of the present example are designed to cooperate with the hook parts 13 to grip the rod-shaped parts 32 when the rod-shaped parts 32 of the gripping jigs 3 are caught by the hook parts 13.

Figure 5:
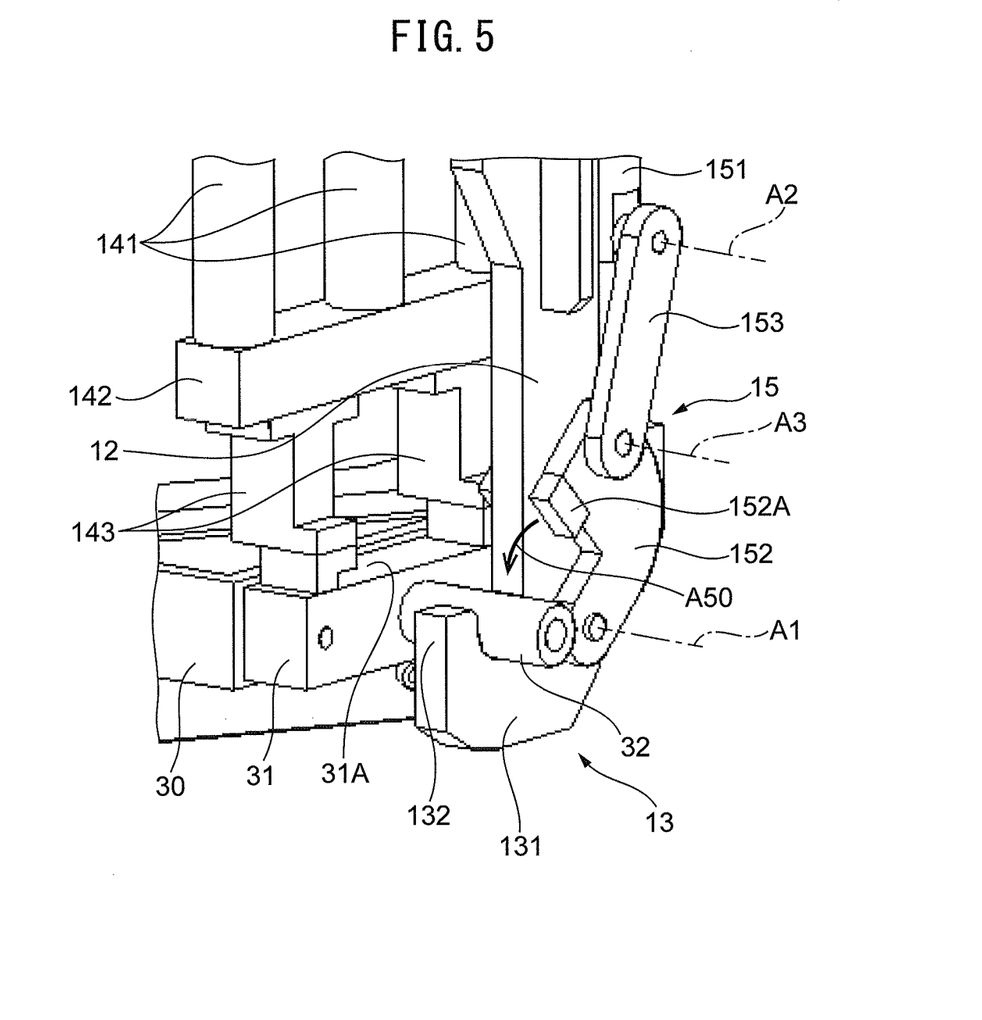
FIG. 5 is a perspective view enlarging the gripping parts and hook parts shown in FIG. 4.

FIG. 5 is a perspective view enlarging a gripping part 15 and hook part 13 shown in FIG. 4. As shown in FIG. 4 and FIG. 5, the gripping part 15 of the present example comprises a linear movement part 151 attached to the body part 11 so as to be able to linearly move, a swiveling part 152 attached to the projecting part 12 so as to be able to swivel, and a link part 153 connected to both the linear movement part 151, and swiveling part 152 so as to be able to swivel. Here, the linear movement part 151 of the present example can move linearly in both directions along the direction of projection of the projecting part 12 and is driven by a drive device D2 attached to the body part 11. In the example of FIG. 4 and FIG. 5, the drive device D2 of the linear movement part 151 is an air cylinder. The linear movement part 151 is the piston rod of the air cylinder.

Referring to FIG. 5, the swiveling part 152 of the gripping part 15 of the present example has an L-shape as a whole. One end part is attached to a projecting part 12 so as to be able to swivel about a predetermined axis A1. In the example of FIG. 4 and FIG. 5, the axis A1 of the swiveling part 152 is arranged at the front end part of the projecting part 12 and is oriented substantially parallel to the longitudinal direction of the base part 110. At the other end of the swiveling part 152, an abutting part 152A is provided so as to be able to abut against the outer circumference surface of the rod-shaped part 32 caught by the hook part 13. The swiveling part 152 having such a structure can move between an abutting position where it abuts against the outer circumferential surface of the rod-shaped part 32 caught on the hook part 13, and a retracted position where it is separated from the outer circumferential surface of the rod-shaped part 32 caught at the hook part 13 by swiveling about the above axis A1.

When the swiveling part 152 of the gripping part 15 is present at the above abutting position, the rod-shaped part 32 caught on the hook part 13 is gripped between the hook part 13 and the gripping part 15. Due to this, it is possible to prevent the rod-shaped part 32 of the gripping jig 3 from dropping off from the hook part 13 during conveyance of the conveyed object W. On the other hand, when the swiveling part 152 of the gripping part 15 is at the retracted position, the rod-shaped part 32 caught on the hook part 13 is released from the gripping part 15. Note that, to make the rod-shaped part 32 catch on the hook part 13, the swiveling part 152 of the gripping part 15 has to be held at the retracted position. The swiveling part 152 of the gripping part 15 in FIG. 5 is held at the retracted position. The arrow mark A50 in FIG. 5 indicates the swiveling direction when the swiveling part 152 of the gripping part 15 moves from the retracted position to the abutting position.

Further, the link part 153 of the gripping part 15 of the present example is swivelably connected to each of the front end part of the linear movement part 151 and the end part of the swiveling part 152 far from the axis A1 so as to convert the linear movement motion of the linear movement part 151 to rotational movement of the swiveling part 152. More specifically, the downward linear motion of the linear movement part 151 in FIG. 5 (that is, the forward motion of the piston rod) is converted to rotational motion toward the abutting position of the swiveling part 152. On the other hand, the upward linear motion of the linear movement part 151 in FIG. 5 (that is, the backward motion of the piston rod) is converted to rotational motion toward the retracted position of the swiveling part 152. As shown in FIG. 5, the two axes A2, A3 of the rotational motion of the link part 153 are oriented in directions parallel to the axis A1 of the rotational motion of the swiveling part 152. In this way, the hand 1 of the present example uses a drive device D2 of an air cylinder etc. to drive the gripping part 15 to thereby switch between a gripping state where the gripping part 15 cooperates with the hook part 13 to grip the rod-shaped part 32 and a released state where the gripping part 15 releases the rod-shaped part 32.

Figure 6:
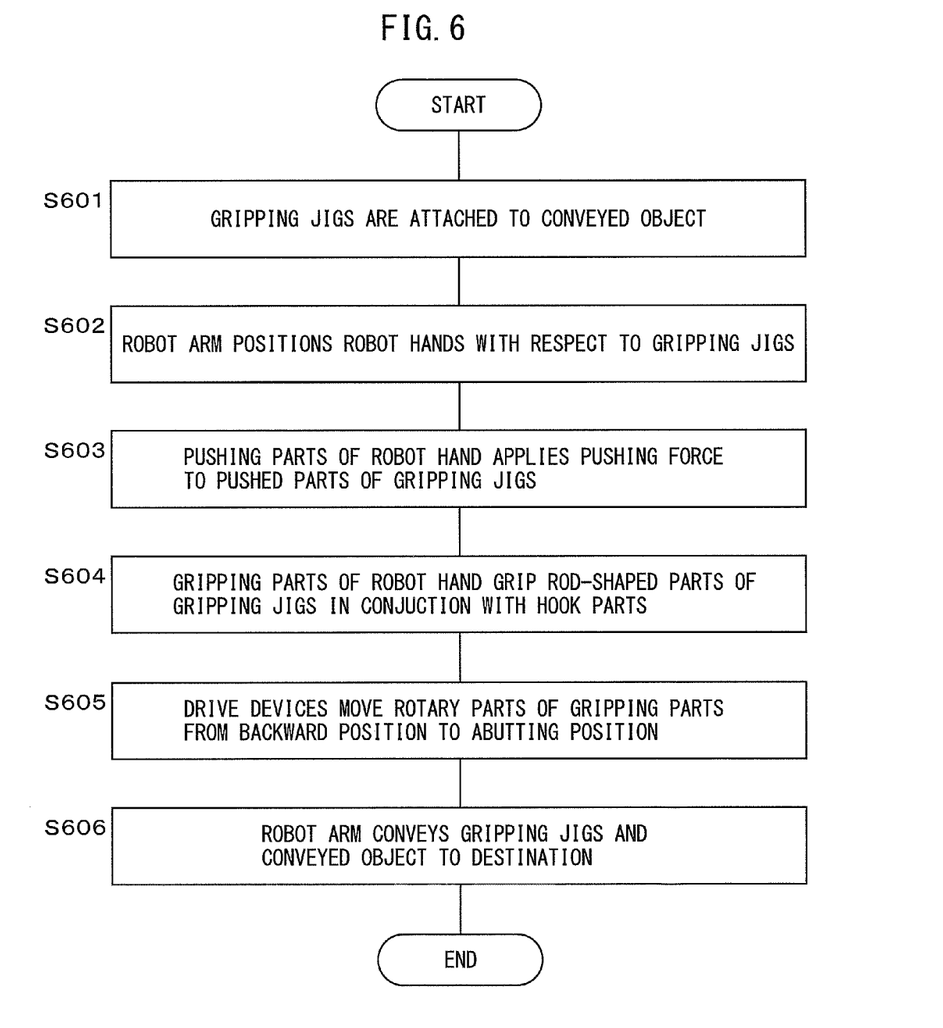
FIG. 6 is a flow chart showing a routine of conveying a conveyed object, using the conveyor system of FIG. 1.

Next, the conveyance method for conveying a conveyed object W using the conveyor system S of the present embodiment will be explained. FIG. 6 is a flow chart showing a routine for conveying a conveyed object W using the conveyor system S of FIG. 1. Note that, the conveyed object W conveyed by the conveyor system S is placed in advance on the horizontal surface of the above table T. At the point of time when the routine of the flow chart of FIG. 6 is started, the pair of pushing parts 14, 14 of the hand 1 are held at the above backward positions, while the swiveling parts 152, 152 of the pair of gripping parts 15 are held at the above retracted positions.

Further, the pair of projecting parts 12, 12 of the hand 1 are in accordance with need moved relatively along the longitudinal direction of the base part 110. Due to this, the distance between the pair of hook parts 13, 13 is adjusted, and therefore various dimensions of conveyed objects W can be gripped using the same gripping jigs 3, 3. In particular, the pair of pushing parts 14, 14 of the hand 1 are similarly moved relatively along the above direction. Due to this, the distance between the abutting surfaces of the pair of pushing parts 14, 14 is also adjusted. Alternatively, the abutting parts 143, 143 of the pair of pushing parts 14, 14 may be exchanged with separate shapes of abutting parts 143, 143 to adjust the distance between the abutting surfaces of the pair of pushing parts 14, 14.

As shown in FIG. 6, at step S601, the pair of gripping jigs 3, 3 are attached by the user to the conveyed object W. During this step, the pair of gripping jigs 3, 3 are attached to the conveyed object W so that these rod-shaped parts 32, 32 extend in opposite directions along a horizontal plane. In particular, the pair of gripping jigs 3, 3 are preferably attached to the conveyed object W so that the axes of these rod-shaped parts 32, 32 match with each other. Due to this, the pair of the rod-shaped parts 32, 32 and pushed parts 31, 31 are arranged symmetrically, and therefore it becomes easy to position the hand 1 with respect to the pair of gripping jigs 3, 3. Note that, at step S601, the pair of gripping jigs 3, 3 may be attached to the conveyed object W not by manual work of the user, but by an automated process of various types of attachment devices.

Next, at step S602, the arm 2 of the conveyor robot R positions the hand 1 with respect to the pair of gripping jigs 3, 3 attached to the conveyed object W. More specifically, at step S602, the arm 2 of the conveyor robot R moves the hand 1 with respect to the pair of gripping jigs 3, 3 so that the rod-shaped parts 32, 32 of the pair of gripping jigs 3, 3 are caught on the pair of hook parts 13, 13 of the hand 1. During this step, the hand 1 is maintained in a posture where the bottom surface of the base part 110 faces downward in the direction of gravity and the base part 110 is parallel to the horizontal plane. For this reason, the hook parts 13, 13 are respectively caught from below in the direction of gravity of the rod-shaped parts 32, 32 (see FIG. 4 and FIG. 5).

Next, at step S603, the pushing parts 14, 14 of the hand 1 apply pushing forces to the pushed parts 31, 31 of the pair of gripping jigs 3, 3. More specifically, at step S603, drive devices D1 such as air cylinders make the pushing parts 14, 14 move in directions away from the body part 11 so that the pushing parts 14, 14 abut against the pushed parts 31, 31. After that, the drive forces of the drive devices D1 are continuously applied to the pushing parts 14, 14, and therefore the pushing forces along the directions of movement of the pushing parts 14, 14 are applied from the pushing parts 14, 14 to the pushed parts 31, 31. As a result, the rod-shaped parts 32, 32 are supported by the hook parts 13 of the hand 1 from below, the pushed parts 31, 31 are pushed by the pushing parts 14 of the hand 1 from above, and therefore the pair of gripping jigs 3, 3 as a whole are gripped in a fixed manner by the hand 1.

Next, at step S604, the gripping parts 15, 15 of the hand 1 grip the rod-shaped parts 32 caught on the hook parts 13, 13, in conjunction with the hook parts 13, 13. More specifically, at step S605, drive devices D2 such as air cylinders move swiveling parts 152 of the gripping parts 15, 15 from the above retracted positions to abutting positions. As a result, the rod-shaped parts 32, 32 are supported by the hook parts 13 of the hand 1 from below and are supported by the gripping parts 15 of the hand 1 from above. That is, the rod-shaped parts 32, 32 are gripped between the hook parts 13 and gripping parts 15 of the hand 1. Next, at step S606, the arm 2 conveys the pair of gripping jigs 3, 3 and conveyed object W which are gripped by the hand 1 up to a predetermined destination. With this, the routine of the flow chart of FIG. 6 is ended.

As explained above, according to the conveyor system S of the present embodiment, it is possible to grip the conveyed object W through the intermediary of the pair of gripping jigs 3, 3 by hooking the rod-shaped parts 32, 32 of the pair of gripping jigs 3, 3 attached to the conveyed object W, on the pair of hook parts 13, 13 of the hand 1, and then pushing the pushed parts 31, 31 of the pair of gripping jigs 3, 3 by means of the pair of pushing parts 14, 14 of the hand 1. Therefore, according to the conveyor system S of the present embodiment, by using suitable gripping jigs 3, 3 corresponding to shapes of individual conveyed objects W, it is possible to grip various shapes of conveyed objects W with a single hand having a simple structure. Further, according to the conveyor system S of the present embodiment, the gripping force of the hand 1 never directly acts on the conveyed object W, and therefore the gripping force of the hand 1 can be prevented from damaging the conveyed object W.

EFFECT OF INVENTION

According to the first and fifth aspects of the present invention, it is possible to grip the conveyed object through the intermediary of the pair of gripping jigs by hooking rod-shaped parts of a pair of gripping jigs attached in advance to a conveyed object, on a pair of hook parts of the hand, and then pushing a pair of the pushed parts of the gripping jigs by means of the pair of pushing parts of the hand. Therefore, according to the first and fifth aspects, by using suitable gripping jigs corresponding to the shapes of the individual conveyed objects, it is possible to convey various shapes of conveyed objects with a single hand which has a simple structure to grip. Further, according to the first and fifth aspects, the gripping forces of the hand never directly act on the conveyed object, and therefore it is possible to prevent the gripping forces of the hand from damaging the conveyed object.

According to the second aspect of the present invention, the pair of projecting parts can be moved relative to each other to thereby adjust the distance between the pair of hook parts, and therefore it is possible to use various dimensions of gripping jigs to grip a conveyed object.

According to the third aspect of the present invention, air cylinders are used for driving the pushing parts of the hand, and therefore production of the hand becomes easy and inexpensive.

According to the fourth aspect of the present invention, in addition to the pushed parts of the gripping jigs being pushed by the pushing parts of the hand, the rod-shaped parts of the gripping jigs are gripped between the gripping parts and the hook parts, and therefore the rod-shaped parts of the gripping jigs are prevented from falling off from the hook parts during conveyance of the conveyed object.

According to the sixth aspect of the present invention, the rod-shaped parts of the pair of gripping jigs and pushed parts are arranged symmetrically, and therefore it becomes easy to position the hand with respect to the pair of gripping jigs.

The present invention is not limited to only the above embodiment and can be modified in various ways within the scope which is described in the claims. For example, in the above embodiment, a vertical multi-articulated robot is illustrated as the conveyor robot R, but the conveyor robot in the conveyor system of the present invention may be any mechanical device, including a horizontal multi-articulated robot and orthogonal robot, which can freely change the position of a hand which is attached to an arm. Further, in the above embodiment, air cylinders are illustrated as the drive devices D1 of the pushing parts 14, but the drive devices of the pushing parts in the conveyor system of the present invention may be any linear movement actuators including electric motors, electromagnetic solenoids, hydraulic cylinders, etc. The same is also true for the drive devices of the gripping parts in the conveyor system of the present invention. Furthermore, the dimensions, shapes, materials, etc. of the hand 1 and gripping jigs 3 which are described in the above embodiment are only examples. Various dimensions, shapes, materials, etc. can be employed to achieve the effects of the present invention.

The invention claimed is:

1. A conveyor system comprising a conveyor robot having a hand and arm, and a pair of gripping jigs attached to a conveyed object, wherein
said hand comprises
a body part attached to said arm,
a pair of projecting parts projecting out from different positions of said body part in the same direction,
hook parts attached to said pair of projecting parts, and
pushing parts attached to said body part adjoining said pair of projecting parts and configured to move along the projecting direction of said pair of projecting parts to generate pushing forces, and
said pair of gripping jigs comprises
rod-shaped parts caught on hook parts of said hand and
pushed parts pushed by said pushing parts of said hand.

2. The conveyor system according to claim 1, wherein said pair of projecting parts are attached to said body part so as to be able to move relatively along a longitudinal direction of said body part.

3. The conveyor system according to claim 1, wherein said pushing parts are driven by air cylinders.

4. The conveyor system according to claim 1, wherein said hand further comprises gripping parts which grip said rod-shaped parts in conjunction with said hook parts when said rod-shaped parts are caught on said hook parts.

5. A conveyance method for conveying a conveyed object, using a conveyor system according to claim 1, comprising:
attaching said pair of gripping jigs to a conveyed object so that said rod-shaped parts of said pair of gripping jigs extend in directions opposite to each other,
moving said hand with respect to said pair of gripping jigs attached to the conveyed object so that said rod-shaped parts of said pair of gripping jigs are caught on said hook parts of said hand, and
moving said pushing parts of said hand move in a direction away from said body part so as to generate a pushing force acting on said pushed parts of said pair of gripping jigs from said pushing parts.

6. The conveyance method according to claim 5 further comprising attaching said pair of gripping jigs to the conveyed object so that the axes of said rod shaped parts of said pair of gripping jigs are parallel with each other.

* * * * *